Patented Dec. 1, 1925.

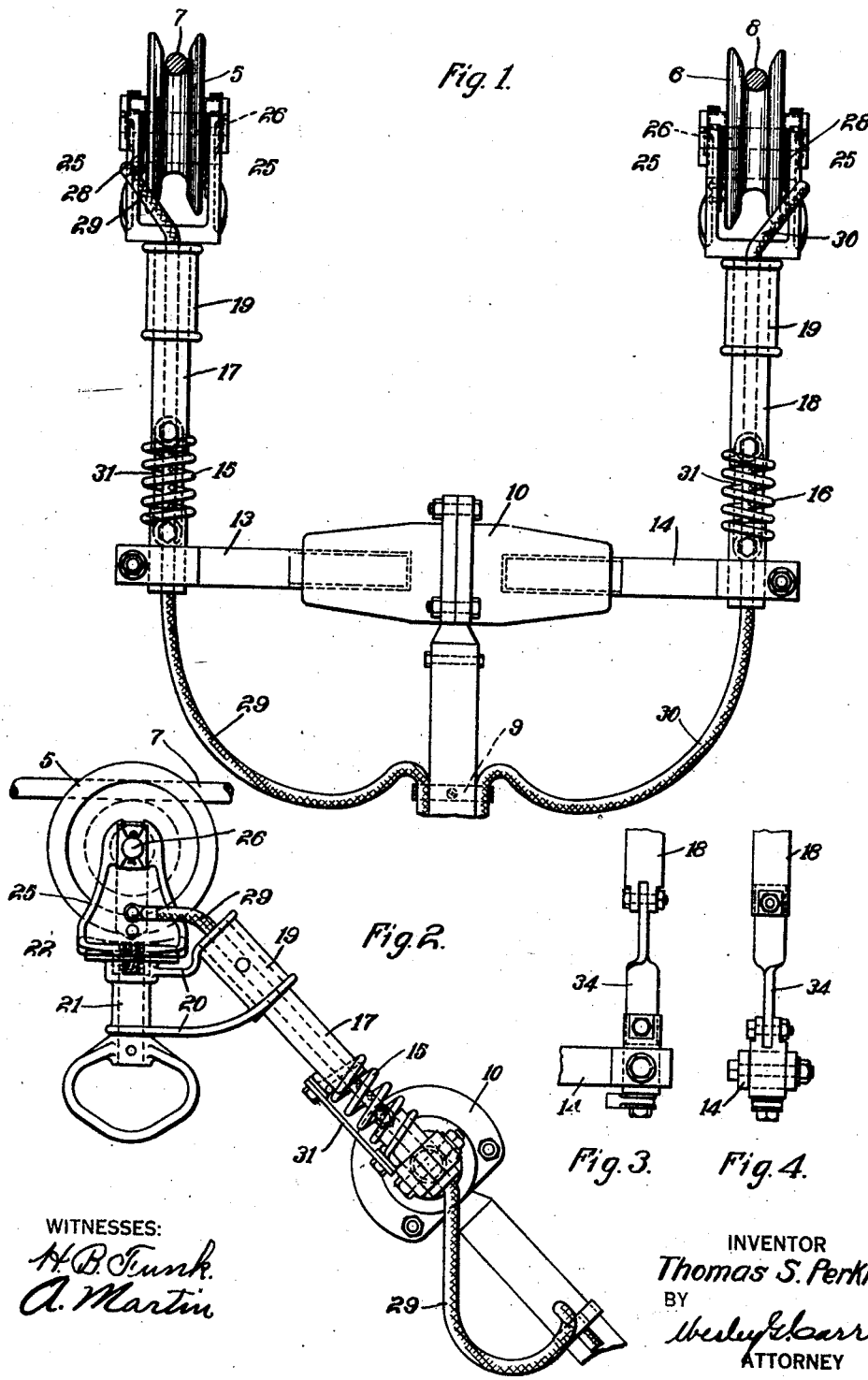

1,563,395

UNITED STATES PATENT OFFICE.

THOMAS S. PERKINS, OF IRWIN, PENNSYLVANIA, ASSIGNOR TO WESTINGHOUSE ELECTRIC & MANUFACTURING COMPANY, A CORPORATION OF PENNSYLVANIA.

TROLLEY POLE.

Application filed November 9, 1921. Serial No. 513,878.

*To all whom it may concern:*

Be it known that I, THOMAS S. PERKINS, a citizen of the United States, and a resident of Irwin, in the county of Westmoreland and State of Pennsylvania, have invented a new and useful Improvement in Trolley Poles, of which the following is a specification.

My invention relates to current collectors and particularly to means for mounting a plurality of contact devices upon a single supporting member.

My invention is designed especially for employment in connection with trolley busses or trackless-trolley vehicles wherein contact members or current collectors are employed to co-operate with a pair of trolley wires. When such collectors are mounted upon a single pole, provision must be made to permit the vehicle to turn out from its normal path of movement, while, at the same time, retaining the current collectors in engagement with their respective trolley wires.

The object of my invention is to provide an improved and simplified form of multiple contact structure whereby engagement between the contact members and the trolley wires will be effectively maintained notwithstanding deviations in the path traveled by the vehicle upon which the contact members are mounted.

In the accompanying drawings, Fig. 1 is a view of my trolley device, in front elevation, Fig. 2 is a view thereof in side elevation, and Figs. 3 and 4 are detail views of a portion of the apparatus in modified form.

In practicing my invention, I provide two trolley wheels 5 and 6, that engage trolley wires 7 and 8, respectively. The trolley wheels are supported through mechanism that will be hereinafter described, by a trolley pole 9, only a portion of which is shown. The trolley pole may be supported upon a swivel base on the roof of a vehicle and normally biased upwardly in the usual manner.

The pole 9 is provided with a cross-head 10 comprising two parts that are bolted together and supported upon the pole 9, as shown in Fig. 1. The cross-head 10 is provided with arms 13 and 14 to which are secured coil springs 15 and 16, respectively, that normally lie in a plane parallel to the plane occupied by the pole 9. The springs 15 and 16, at their upper ends, support tubular members 17 and 18, respectively, that are preferably made of insulating material, such as micarta. The members 17 and 18 support brackets 19 that are provided with arms 20 which are perforated to receive shanks 21 of swivel members 22.

Each of the swivel members 22 is provided with a pair of upstanding arms 25 that are perforated to receive a shaft 26 upon which the trolley wheel is rotatably mounted.

The members 25 are provided with yielding contact devices 28 to which the upper ends of conductors 29 and 30 are secured, these contact devices serving to complete the circuit through the trolley wheels 5 and 6 and the cables 29 and 30. The cables extend through the tubular members 17 and 18, and along the trolley pole 9 to the motive apparatus of the vehicle.

Each of the arms 13 and 14 is provided with a yielding plate 31 that is rigidly secured thereto at one end, and, at its other end, it has a pin-and-slot connection to the under side of the one or the other of the micarta tubes 17 and 18, as the case may be. The members 31 serve to stiffen or brace the arms 17 and 18 against excessive bending downwardly, as the springs 15 and 16, together with arms 17 and 18, normally occupy inclined positions.

It will be observed that each of the springs 15 and 16 permits its associated trolley wheel to flex in all directions so that the trolley wheels may closely follow irregularities in the trolley wires with which they engage. Thus, if the trolley wires 7 and 8 occupy different horizontal planes, the springs 15 and 16 permit movement of the wheels 5 and 6 in vertical planes, to automatically adjust themselves to such variations in height.

If the wires 7 and 8 are spaced irregularly in a lateral direction, or the crosshead 10, by reason of the vehicle turning out from its normal path of travel beneath the trolley wires 7 and 8, is turned diagonally of the wires, the springs 15 and 16 will readily flex in a direction transversely of the trolley wires and thereby permit the current collectors 5 and 6 to readily adapt themselves to variations in the lateral spacing of their points of engagement with the trolley wires.

In Figs. 3 and 4, I have shown a spring 34 that may be employed instead of each of the helical springs 15 and 16. The spring 34 is flexible throughout substantially its entire length but is so bent intermediate its ends, that it may flex in either of two planes that are disposed at right angles to each other. Such springs also permit the trolley wheels 5 and 6 to follow the irregularities of the trolley wires in either horizontal or vertical directions.

If desired, only one of the springs 15 and 16 need be employed, and the other trolley wheel be rigidly supported upon the crosshead 10, but, in such a structure, the wheels would not so readily follow the irregularities of the trolley wires.

Various modifications may be made in the device without departing from the spirit of the invention, as set forth in the appended claims.

What I claim as my invention is:

1. The combination with a trolley pole of a yielding element supported at the outer end thereof, a current collector supported by the said element and a supplemental yielding device for opposing movement of the said element in one direction.

2. The combination with a trolley pole normally lying in inclined position, of an elongated spring supported at the extremity thereof in a position parallel to that of the pole, a current collector carried by the spring, and a stiffening member secured to the pole, for supporting the spring against movement out of alinement with the pole in one direction.

3. The combination with a trolley pole normally lying in inclined position, of an elongated spring supported adjacent to the extremity thereof in a position parallel to that of the pole, a current collector carried by the spring and a stiffening member for resisting downward movement of the current collector.

4. The combination with a trolley pole, of a yielding member carried thereby, a current collector carried by the yielding member, and means for limiting movement of the current collector about its yielding support.

In testimony whereof, I have hereunto subscribed my name this 7th day of November 1921.

THOMAS S. PERKINS.